April 2, 1968        C. G. HARD        3,375,667

REVETMENT STRUCTURE AND UNITS THEREFOR

Filed June 13, 1966

INVENTOR.
CARL G. HARD
BY Harry S. Boyd
ATTORNEY

United States Patent Office 3,375,667
Patented Apr. 2, 1968

3,375,667
REVETMENT STRUCTURE AND UNITS THEREFOR
Carl G. Hard, 14 Spring Lane,
Framingham, Mass. 01701
Filed June 13, 1966, Ser. No. 557,866
6 Claims. (Cl. 61—37)

ABSTRACT OF THE DISCLOSURE

The invention comprises a bar having a plurality of parallel grooves. The bars are stacked in a symmetrically interlocking relationship to form a revetment structure.

---

The invention described herein may be manufactured and used by or for the Government for governmental purposes without payment to me of any royalty thereon.

This invention relates to revetment units useful to stabilize breakwaters, jetties, and other embankments exposed to erosion.

Summary

This invention describes revetment units of circular or hexagonal cross-section. The units have parallel grooves defined by the walls of adjacent frustums and have an inner facial angle of no greater than 160 degrees.

It is an object of this invention to provide revetment units having a very high mass exposure surface ratio which, when interlocked, maximize mass, shear resistance, and roughness.

It is another object to provide revetment units easily adaptable to different slopes and effective without filters over gravel and quarry waste.

It is a further object to provide revetment units adaptable to soft foundations and underwater placement which, when covering an embankment, incorporate a labyrinth of voids, providing wave energy absorption and back pressure relief.

Brief description of the drawings

These and other objects will become apparent with reference to the following description and drawings wherein.

Description of the preferred embodiments

Figure 1:
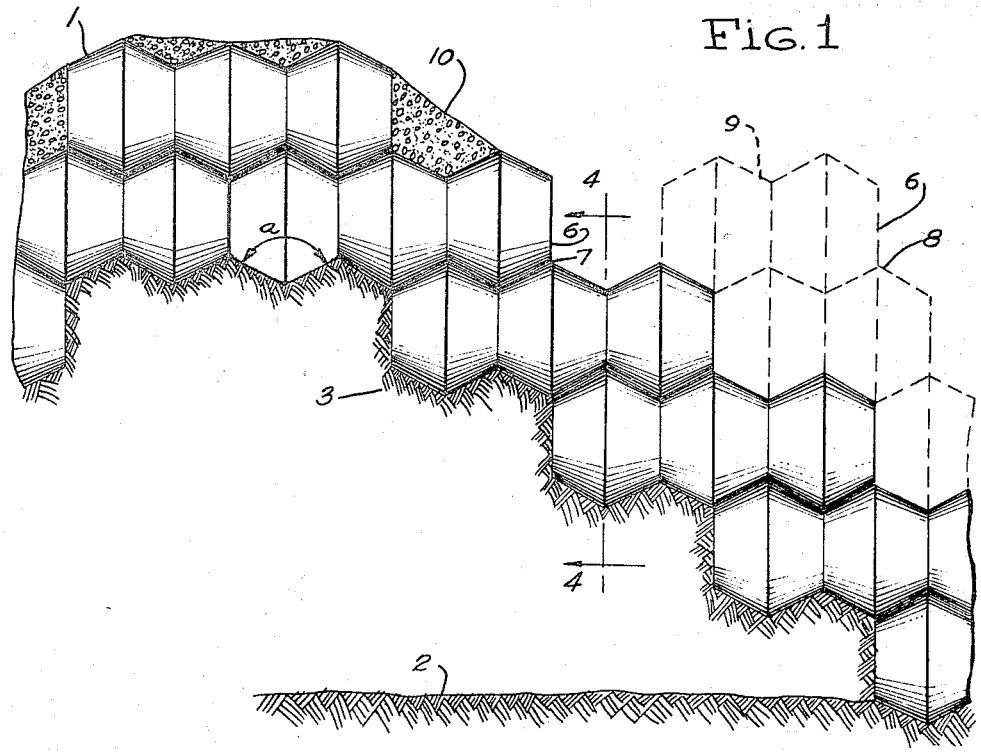
FIG. 1 depicts the revetment units of this invention in interlocking placement covering an embankment.

Referring to the drawings, the trigon, crinkle bar 1 of this invention is particularly useful in symmetrical placement as shown in FIG. 1.

The units may be stacked, as shown in FIG. 1, on a foundation bed, 2, on a shore embankment, or on a prepared rock core, 3. The revetment should extend below the water level if used on a shore line.

Figure 2:
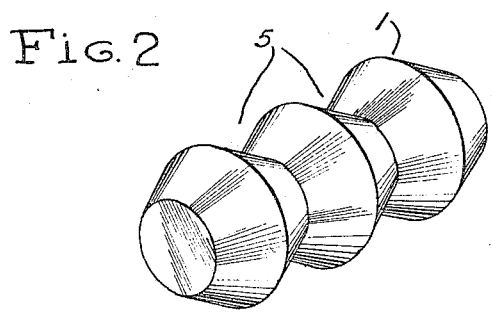
FIG. 2 depicts a perspective view of a single revetment unit incorporating three, base-to-base, conical frustums having a circular cross-section.
Figure 3:
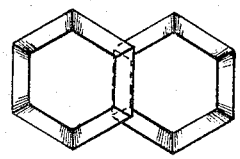
FIG. 3 depicts the cross-section of two hexagonal crinkle bars of this invention in interlocking position.

The utility of the crinkle bars of this invention resides in the combination of superior shear strength, surface friction, and a greater ratio of surface area exposed to waves per unit mass, achieved through the relative symmetrical emplacement of crinkle bars having the novel shape depicted in FIG. 2 or 3.

As shown in the drawings, the unitary crinkle bar 1 provided by the present invention comprises a plurality of axially-spaced, substantially identical frustums arranged in base-to-base relationship. In preferred embodiments, each frustum may have either a circular or hexagonal cross-section. As shown in FIG. 2, crinkle bar 1 includes a pair of annular grooves 5 mutually spaced equidistantly from the ends of bar 1. Each groove 5 is defined by the adjoining peripheral surfaces of the adjacent pair of frustums comprising bar 1. Preferably, crinkle bar 1 is fabricated from concrete or some other material of similar strength and is cast as a single unit.

Figure 4:
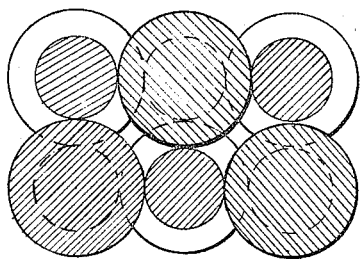
FIG. 4 is a cross-section of FIG. 1 along line 4—4 illustrating the interlocking placement of the revetment units of this invention.

Whether the crinkle bars have the circular cross-section of FIG. 2 or the hexagonal cross-section of FIG. 3, the interfacial angle, $a$, formed by the walls of each groove 5 should not exceed 160 degrees. If the angle exceeds 160 degrees, the individual bars, when emplaced in a revetment structure as shown in FIGS. 1 and 4, will not sufficiently interlock to resist the expected shear forces.

In preferred embodiments, the overall length of each crinkle bar, is not less than three and one half feet. In addition an overall length to width ratio of 2½:1 has been found to be most effective. To obtain this desired ratio, the crinkle bar contemplated by the present invention will normally include no more than three annular grooves. To insure that the crinkle bar has sufficient strength, the minimum diameter of each bar, within the annular grooves, should not be less than eight inches.

The slope of the revetment structure will depend on the method in which the individual crinkle bar units are stacked and on the size of the interfacial angle, $a$, of each unit. FIG. 1 illustrates a revetment structure formed of a plurality of individual crinkle bar units, stacked one upon another with the annular grooved portions of adjacent bars symmetrically interlocking. FIG. 1 depicts an approximately 1:1.5 slope resulting when the forward edge, 6, of each bar abuts the thickest portion of the second division, 7, of its supporting bar.

FIG. 1 in phantom view shows an approximately 2:1 sloping revetment. This steeper slope results from abutting the forward edge of each bar, 6, against the thickest portion of the first division, 8, of its supporting bar.

The phantom view also shows a crinkle bar, 9, having only one annular groove rather than the two-groove bar, 1, shown in FIG. 2.

The slope of a revetment structure may also be varied by varying the long axis of the crinkle bar units, within the hereinbefore stated construction limits.

The revetment structure may also have a grout cap, 10, if a smooth structure is desired.

I claim:

1. An elongated revetment unit for breakwaters, jetties, and the like, said unit comprising a bar having a plurality of annular grooves, each groove defined by the side walls of base-to-base, substantially similar frustums, axially aligned in an abutting facial relation.

2. The revetment unit of claim 1 in which said frustums have a circular cross-section.

3. The revetment unit of claim 1 in which said frustums have a hexagonal cross-section.

4. The revetment unit of claim 1 having a length to width ratio of approximately 2.5:1, the width being measured at the base of the frustum.

5. A revetment structure comprising a plurality of revetment units, each of said units comprising an elongated bar having a plurality of substantially parallel annular grooves mutually spaced equidistantly between the ends of said bar, the walls of said grooves forming an interfacial angle of no more than 160 degrees; said structure formed by the interlocking of staggered units so that the side walls of each unit between the annular grooves in said units interfits in the annular groove of adjacent units, said structure covering corresponding layers of foundation.

6. The revetment structure of claim 5 in which each of said revetment units includes a plurality of base-to-base frustums, axially aligned in an abutting facial relation, and in which said annular grooves are defined by the side walls of the abutting faces of adjacent pairs of said frustums.

References Cited

UNITED STATES PATENTS

| 2,766,592 | 10/1956 | Danel et al. | 61—37 X |
| 3,176,468 | 4/1965 | Nagai et al. | 61—37 X |
| 3,210,944 | 10/1965 | Svee | 61—37 X |

FOREIGN PATENTS

| 1,381,245 | 11/1964 | France. |

JACOB SHAPIRO, *Primary Examiner.*